(12) United States Patent
Zuzovski et al.

(10) Patent No.: US 11,687,462 B1
(45) Date of Patent: *Jun. 27, 2023

(54) CONFIGURABLE CACHING POLICY FOR TRANSFERRING DATA VIA SHARED MEMORY

(71) Applicant: Amazon Technologies, Inc., Seattle, WA (US)

(72) Inventors: Michael Zuzovski, Kishon Lezion (IL); Ofer Naaman, Hod Hasharon (IL); Adi Habusha, Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,612

(22) Filed: Mar. 4, 2022

Related U.S. Application Data

(63) Continuation of application No. 16/995,091, filed on Aug. 17, 2020, now Pat. No. 11,275,690.

(51) Int. Cl.
| | | |
|---|---|---|
| *G06F 12/08* | (2016.01) | |
| *G06F 12/084* | (2016.01) | |
| *G06F 12/0871* | (2016.01) | |
| *G06F 9/54* | (2006.01) | |

(52) U.S. Cl.
CPC ............ *G06F 12/084* (2013.01); *G06F 9/544* (2013.01); *G06F 12/0871* (2013.01)

(58) Field of Classification Search
CPC ..... G06F 12/084; G06F 9/544; G06F 12/0871
See application file for complete search history.

(56) References Cited

U.S. PATENT DOCUMENTS

| | | |
|---|---|---|
| 9,021,208 B2 | 4/2015 | Ochi et al. |
| 2014/0281248 A1 | 9/2014 | Alameldeen et al. |

OTHER PUBLICATIONS

U.S. Notice of Allowance dated Nov. 10, 2021, in U.S. Appl. No. 16/995,091.

*Primary Examiner* — Jae U Yu
(74) *Attorney, Agent, or Firm* — Weaver Austin Villeneuve & Sampson LLP

(57) ABSTRACT

Techniques are disclosed for transferring a message between a sender agent and a receiver agent via a shared memory having a main memory and a cache. Feedback data indicative of a number of read messages in the shared memory is generated by the receiver agent. The feedback data is sent from the receiver agent to the sender agent. A number of unread messages in the shared memory is estimated by the sender agent based on the number of read messages. A threshold for implementing a caching policy is set by the sender agent based on the feedback data. The message is designated as cacheable if the number of unread messages is less than the threshold and as non-cacheable if the number of unread messages is greater than the threshold. The message is written to the shared memory based on the designation.

20 Claims, 6 Drawing Sheets

CONFIGURABLE CACHING POLICY FOR TRANSFERRING DATA VIA SHARED MEMORY

CROSS-REFERENCE TO RELATED APPLICATIONS

This application is a continuation of U.S. patent application Ser. No. 16/995,091, filed Aug. 17, 2020, issued as U.S. Pat. No. 11,275,690 on Mar. 15, 2022, and entitled "CONFIGURABLE CACHING POLICY FOR TRANSFERRING DATA VIA SHARED MEMORY", the content of which is incorporated herein by reference in its entirety.

BACKGROUND

Computer hardware devices can includes various levels of memory of various speeds. One type of memory is cache memory (or simply "cache"), which is a high-speed memory that is costlier than main memory but more economical than processor registers. When a processor writes to or reads from the cache memory instead of the main memory, it saves time and/or energy. In many computing devices, there may be limitations in the size of the cache memory available due to size, cost, and thermal constraints. Accordingly, various techniques may be employed to restrict what data can be written to a location in the cache.

In some implementations, when trying to read from a location in the main memory, the processor checks whether the data from that location is already in the cache memory. If the data is in the cache, then a cache hit occurs and the processor can read from the cache instead of the main memory. If the data is not in the cache, then a cache miss occurs and the processor experiences execution delays by having to fetch the data from the main memory.

Data may be written to the cache memory in blocks of fixed size referred to as cache lines. The cache memory is comprised of a set of storage blocks of various sizes depending on the caching structure, which is often determined by the size of the cache lines. For example, many processors have cache lines of 32 bytes, 64 bytes, 128 bytes, 256 bytes or larger, and the sizes of the storage blocks may be multiples of the size of the cache lines. In some instances, each of the blocks may be indexed by a block index which facilitates addressing locations in the cache memory.

BRIEF DESCRIPTION OF THE DRAWINGS

Various embodiments in accordance with the present disclosure will be described with reference to the drawings, in which.

DETAILED DESCRIPTION

Figure 1:
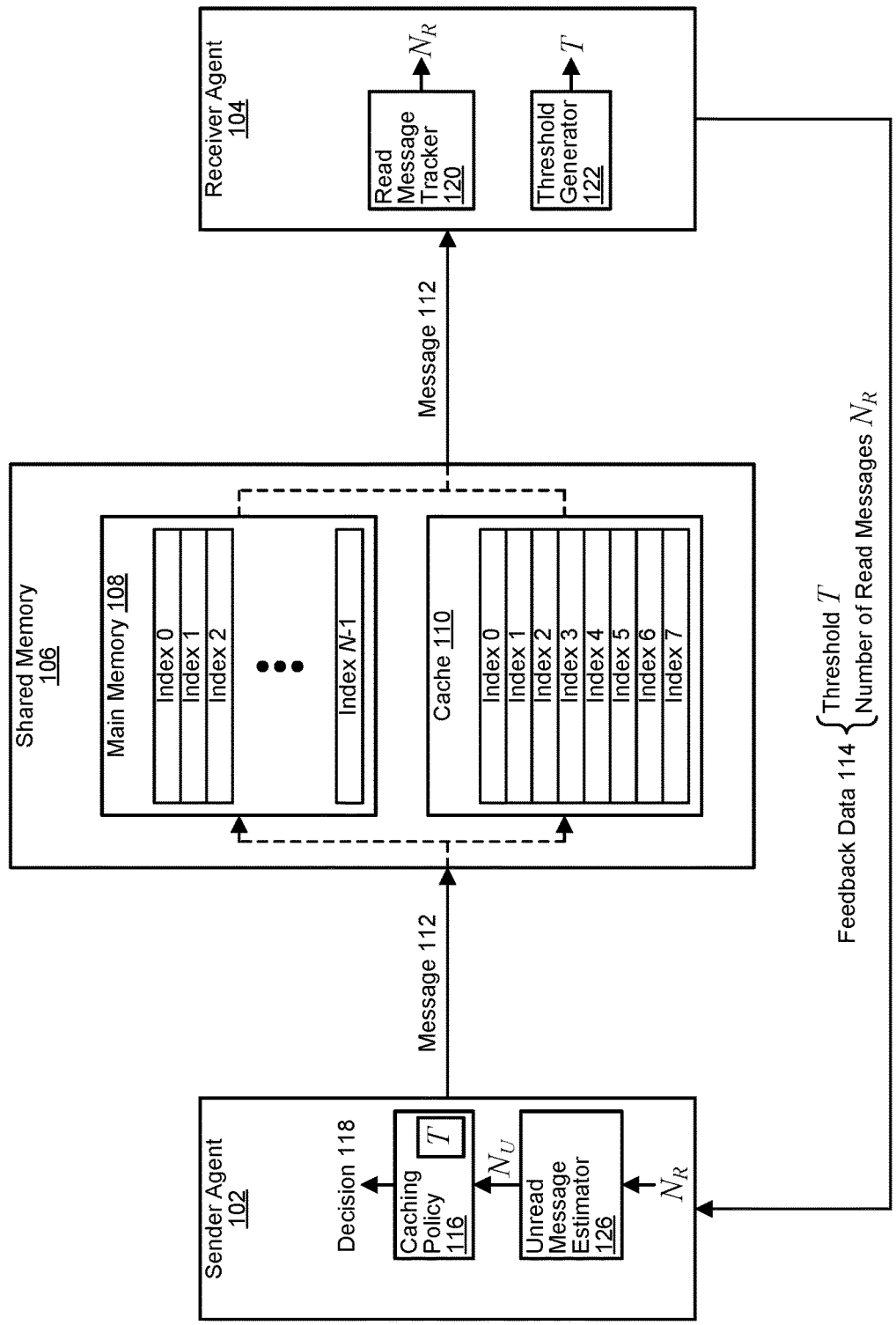
FIG. 1 includes a block diagram illustrating an example of a system for transferring data between a sender agent and a receiver agent.

In many electronic systems, such as in a system on a chip (SoC) environment, data is often transferred between different processes or agents through the use of a shared memory having multiple levels or speeds. In one example, a sender agent may receive a request to transfer a message containing data to a receiver agent. Typically, the sender agent writes the message to a location in a main memory of the shared memory. The main memory may be a low-cost and high-capacity computer memory, such as dynamic random access memory (DRAM). Due to the coherent nature of the SoC environment, the receiver agent may be aware of the location in the main memory at which the message was written. After some period of time, the receiver agent fetches the message from the location in the main memory and uses the data in the message for an intended purpose.

To accelerate the transfer, the sender agent may alternatively or additionally write the message to a cache of the shared memory. The cache may be a higher cost, lower capacity, and higher speed computer memory compared to the main memory, such as static random access memory (SRAM). When the message is written to a location in the cache, the message may be written to an available storage block. If there are no available storage blocks, the message may be written to the storage block containing the oldest data, thereby overwriting the oldest data and removing it from the cache. In the interim between the time that the message is written to the cache and the time that the receiver attempts to fetch the message from the cache, additional write operations to the cache may occur. These write operations may also be performed by the sender agent or by another agent or background process. If enough write operations are performed during the interim, the message is overwritten and a cache miss occurs when the receiver attempts to fetch the message from the cache.

Ideally, the sender agent would have the foresight to only cache the message if the receiver agent is able to fetch the message prior to it being overwritten or evicted. However, this is impractical as the sender agent may not be aware of how long it will be before the receiver agent attempts to fetch the message from the cache or how many other messages or data will be written to the cache during the interim. In some instances, the sender agent may implement a caching policy based on its own behavior, such as the rate at which it has written messages to the cache or how much time has passed since the last time it wrote a message to the cache. However such caching policies suffer from inaccuracy and generally will either choose to cache too frequently or infrequently.

A caching policy that causes the sender agent to cache too frequently can lead to cache thrashing. In many instances, cache thrashing occurs when the cache is written to so excessively that few or none of the messages that are written to the cache are ever read before being overwritten or evicted. This causes the number of cache misses to be far greater than the number of cache hits. Additionally, the sender agent occupies cache lines that could have been used for other processes. A caching policy that causes the sender agent to cache too infrequently leads to underutilization of the cache. While the number of cache misses is also low, the gain in performance due to the few number of cache hits may be negligible.

Embodiments described herein provide for a caching policy to be implemented by the sender agent that incorporates feedback data sent from the receiver agent. The feedback data allows the sender agent to set a threshold based on various factors surrounding usage of the cache by both the receiver agent as well as background processes. The feedback data may also allow the sender agent to determine a variable which may be compared to the cache. The variable may represent the current or predicted usage or busyness of the cache. The caching policy may dictate that when the variable is greater than the threshold, the message is to be written to the main memory only without writing to the cache, and when the variable is less than (or equal to) the threshold, the message is to be written to the cache.

Both the threshold and the variable may be dynamically updated. For example, each of the threshold and the variable may be updated each time new feedback data is received by the sender agent from the receiver agent. In some instances, whichever of the threshold and the variable to which the new feedback data is relevant may be updated. In some instances, to improve efficiency, the variable may be updated much more frequently than the threshold. For example, the variable may be updated more frequently than the threshold at a rate of 10:1, 100:1, 1000:1, and the like. The rate at which a new caching policy decision is determined by evaluating the caching policy (by comparing the updated variable to the threshold) may be much less than the rate at which messages are sent. For example, the variable may be updated and a new caching policy decision may be rendered once for every 100 messages, and the threshold may be updated once for every 100 variable updates. Accordingly, the threshold for the caching policy may be updated only 1 time for every 10,000 messages sent.

In some embodiments, the variable may be the number of unread messages in the shared memory. In some instances, the number of unread messages in the shared memory may correspond to the number of messages that have been written to the shared memory, both by the sender agent and by other processes, that were directed to the receiver agent and have not yet been read by the receiver agent. This number may be computed based on the number of read messages in the shared memory, which may correspond to the number of messages that the receiver agent has read from the shared memory over a period of time. The number of read messages may be a total number of read messages (from an initial time stamp) or an additional number of read messages (e.g., from a previously time stamp at which a previous number of read messages was determined).

In some instances, the receiver agent may determine the exact or approximate number of read messages in the shared memory. The receiver agent may send this number to the sender agent in the feedback data. The sender agent may estimate the number of unread messages in the shared memory, either at the current time or at a future time, based on the number of read messages as received from the receiver agent. For example, the sender agent may predict a future time at which it will evaluate the caching policy and may estimate the number of unread messages based on the difference in time. As another example, the sender agent may estimate the number of unread messages based on the amount of time that has passed from when the receiver agent determined the number of read messages to the current time, which may depend on the amount of time it takes for the receiver agent to generate and send the feedback data and for the sender agent to receive and process the feedback data.

The threshold against which the variable (e.g., number of unread messages) is compared may be calculated based on several factors. In some embodiments, the threshold may be based on the rate at which messages are read from the cache by the receiver agent, alternatively referred to as the receiver read rate. For example, the threshold may be directly proportional to the receiver read rate since, for example, the more the receiver agent reads messages from the cache, the greater the number of unread messages in the cache that can be supported. In some embodiments, the threshold may be based on the rate at which messages are written to the cache by background processes, alternatively referred to as the background write rate. For example, the threshold may be inversely proportional to the background write rate since the more any background process writes messages to the cache, the fewer the number of unread messages in the cache that can be supported. As yet another example, the threshold may be based on the current size of the cache, alternatively referred to as the cache size. For example, the threshold may be directly proportional to the cache size since more unread messages can be supported if the cache size is larger.

In one implementation, the threshold may be calculated by the receiver agent and sent to the sender agent in the feedback data. The sender agent may then set (e.g., update) the threshold in the caching policy to the received threshold. In another implementation, the receiver agent may send information to be used in calculating the threshold to the sender agent in the feedback data. The sender agent may then calculate the updated threshold based on the information and set the threshold in the caching policy to the updated threshold.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes a block diagram illustrating an example of a system for transferring data between a sender agent 102 and a receiver agent 104, in accordance with some embodiments of the present disclosure. The sender agent 102 may correspond to a hardware element (e.g., a processor) or a piece of software running on a hardware element. For example, the sender agent 102 may be a central processing unit (CPU), a graphics processing unit (GPU), a neural network accelerator, an application, a driver, a compiler, or firmware, among other possibilities. Similarly, the receiver agent 104 may correspond to a hardware element (e.g., a processor) or a piece of software running on a hardware element. For example, the receiver agent 104 may be a CPU, a GPU, a neural network accelerator, an application, a driver, a compiler, or firmware, among other possibilities.

Each of the sender agent 102 and the receiver agent 104 may be communicatively coupled to a shared memory 106, which may have a shared memory space and may include a main memory 108 and a cache 110. The cache 110 may be a lower capacity and higher speed computer memory compared to the main memory 108. For example, the main memory 108 may be DRAM and the cache 110 may be SRAM. In the illustrated example, the main memory 108 includes N addressable memory locations (Index 0 to Index N-1) and the cache 110 includes 8 addressable memory locations (Index 0 to Index 7). In some embodiments, the cache 110 may include a circular buffer or ring buffer with an associated read pointer and write pointer. The sender agent 102, which may be configured to write a message 112 to the cache 110, may have knowledge of at least the position of the write pointer, and the receiver agent 104, which may be configured to read the message 112 from the cache 110, may have knowledge of at least the position of the read pointer. In some embodiments, the main memory 108 may alternatively or additionally include a circular buffer or ring buffer with an associated read pointer and write pointer.

Prior to the sender agent 102 writing the message 112 to the shared memory 106, the receiver agent 104 may determine a number of read messages $N_R$ in the shared memory 106. For example, the receiver agent 104 may include a read message tracker 120 that determines the number of read messages in the shared memory 106. In some embodiments, the receiver agent 104 may calculate a threshold T for use in a caching policy 116. For example, the receiver agent 104 may include a threshold generator 122 that calculates the threshold. The threshold may be calculated based on various threshold factors such as the rate at which messages are read from the shared memory 106 by the receiver agent 104, the rate at which messages are written to the shared memory 106 by background processes, the rate at which messages are read from the shared memory 106 by background processes, the rate at which messages are written to the shared memory 106 by the sender agent 102, and the current size of the shared memory 106, among other possibilities.

The receiver agent 104 may send feedback data 114 to the sender agent 102 that includes the threshold and/or the number of read messages in the shared memory 106. Alternatively or additionally, the feedback data 114 may include data from which the threshold and/or the number of read messages in the shared memory 106 may be determined. The sender agent 102 receives the feedback data 114 and estimates a number of unread messages $N_U$ in the shared memory 106 based on the number of read messages $N_R$ in the shared memory 106. For example, the sender agent 102 may include an unread message estimator 126 that estimates the number of unread messages in the shared memory 106 based on the number of read messages in the shared memory 106.

The sender agent may set the threshold of the caching policy 116 to the threshold indicated by the feedback data 114. The sender agent 102 implements the caching policy 116 by comparing the number of unread messages in the shared memory 106 to the threshold to render a decision 118. The decision 118 may be to designate the message 112 as cacheable if the number of unread messages in the shared memory 106 is less than the threshold and non-cacheable if the number of unread messages in the shared memory 106 is greater than the threshold.

If the message 112 is designated as cacheable, the sender agent 102 attempts to write the message 112 to the cache 110. In some embodiments, a memory controller or system fabric associated with the shared memory 106 may receive the message 112 from the sender agent 102 and determine whether it will write the message 112 to the cache 110 or whether it will write the message 112 only to the main memory 108. In some instances, a cacheable message may be written to both the cache 110 and the main memory 108. If the message 112 is designated as non-cacheable, the sender agent 102 attempts to write the message 112 only to the main memory 108. The memory controller may receive the message 112 from the sender agent 102 and write the message 112 to the main memory 108. The receiver agent 104 may then read the message 112 at its location in the shared memory 106.

Figure 2A:
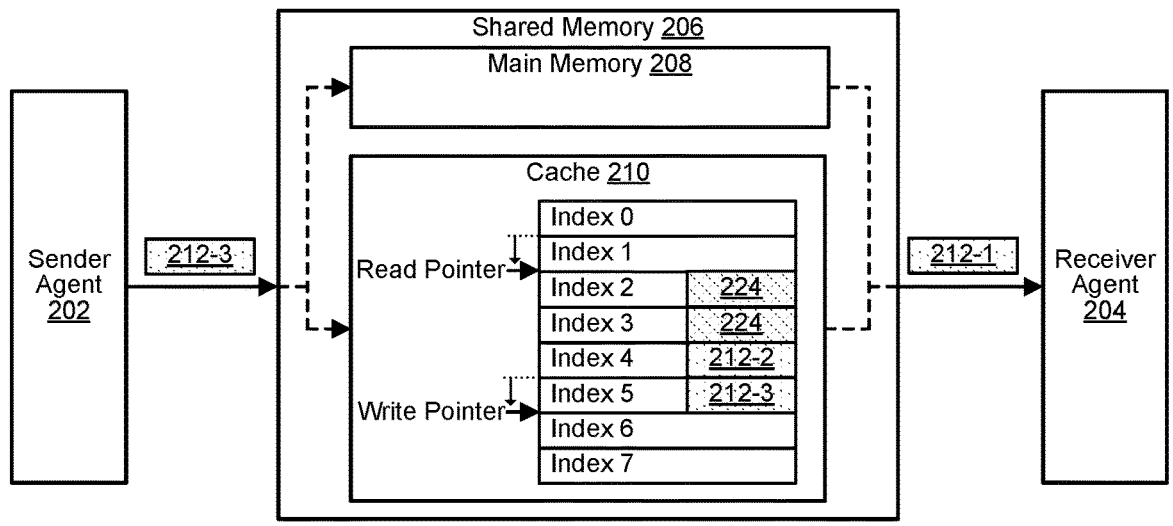
FIGS. 2A-2C include block diagrams illustrating an example operation of a system for transferring data between a sender agent and a receiver agent.
Figure 2B:
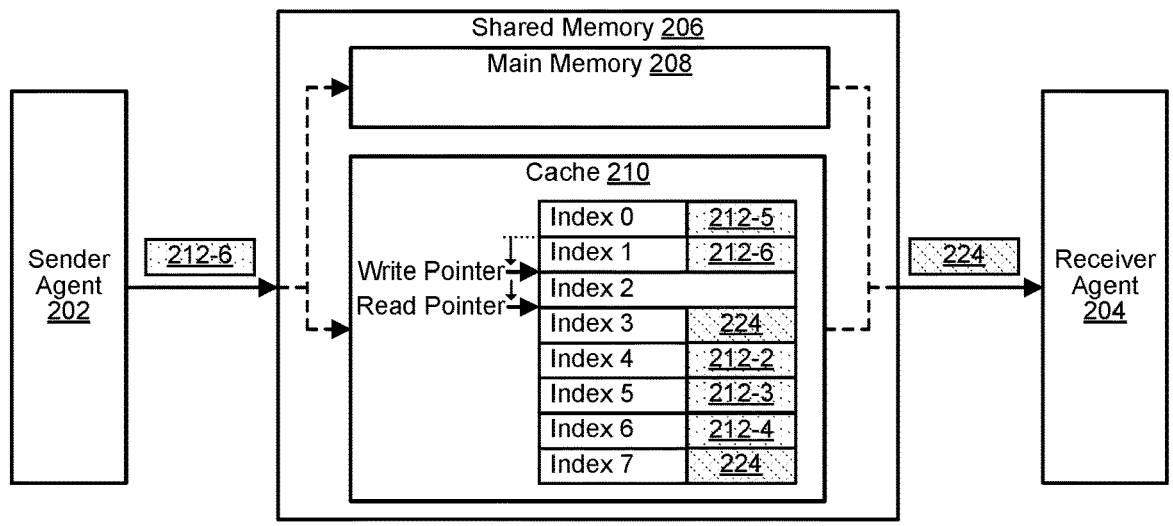
Figure 2C:
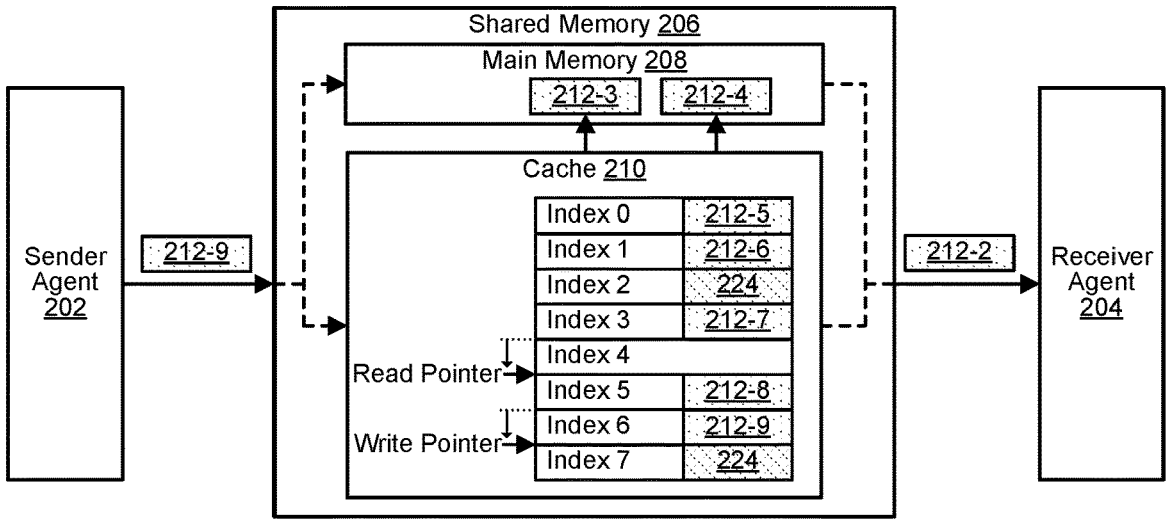

FIGS. 2A-2C include block diagrams illustrating an example operation of a system for transferring data between a sender agent 202 and a receiver agent 204, in accordance with some embodiments of the present disclosure. In the illustrated example, the sender agent 202 implements a caching policy in which it is always determined to write messages 212 to a cache 210 of a shared memory 206. While not illustrated, in some embodiments the messages 212 may additionally be written to a main memory 208 of the shared memory 206.

In reference to FIG. 2A, the sender agent 202 writes the message 212-3 to Index 5 of the cache 210, causing the write pointer to be moved to the position between Index 5 and Index 6. The message 212-1, which was previously written to Index 1, is read by the receiver agent 204, causing the read pointer to be moved to the position between Index 1 and Index 2. Background process messages 224 occupy Index 2 and Index 3, which were written to the cache 210 by one or more background processes, which may correspond to different processes of a multi-core chip.

In reference to FIG. 2B, after the sender agent 202 writes the message 212-4 to Index 6, the one or more background processes write a background message 224 to Index 7, and the sender agent 202 writes the message 212-5 to Index 0, the sender agent 202 writes the message 212-6 to Index 1 of the cache 210, causing the write pointer to be moved to the position between Index 1 and Index 2. The background message 224 that was previously written to Index 2 is read by the receiver agent 204, causing the read pointer to be moved to the position between Index 2 and Index 3.

In reference to FIG. 2C, after the one or more background processes write a background message 224 to Index 2 and the sender agent 202 writes the message 212-7 to Index 3 and the message 212-8 to Index 5, the sender agent 202 writes the message 212-9 to Index 6 of the cache 210, causing the write pointer to be moved to the position between Index 6 and Index 7. This further causes the messages 212-3 and 212-4 to be overwritten and/or evicted to the main memory 208 prior to being read by the receiver agent 204. In some instances, the receiver agent 204 may even waste time and resources looking for the messages 212-3 and 212-4 in the cache 210 before fetching the messages from the main memory 208. Further shown in FIG. 2C is the receiver agent 204 reading the message 212-2 from Index 4, causing the read pointer to be moved to the position between Index 4 and Index 5.

Figure 3A:
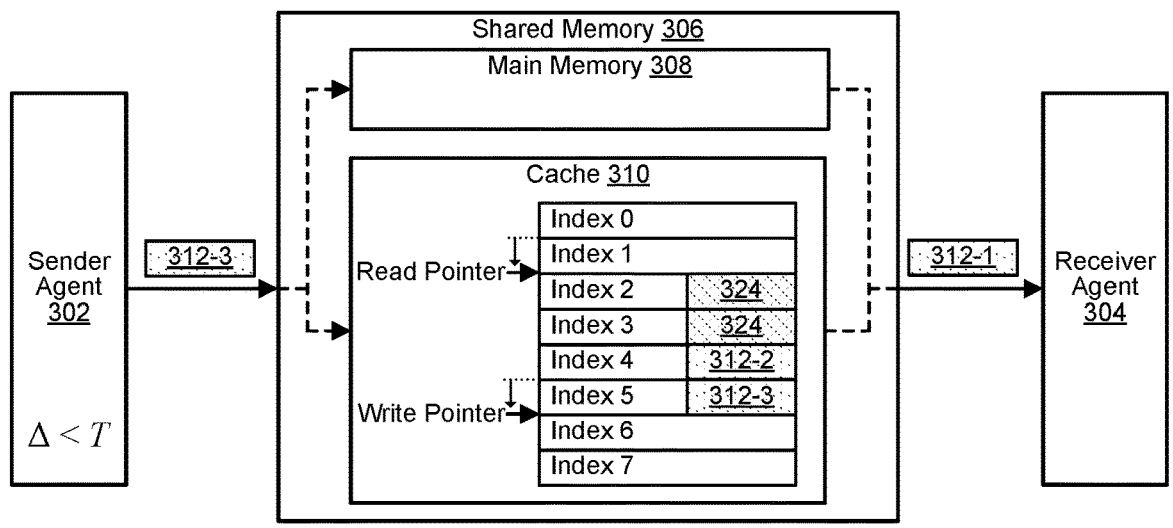
FIGS. 3A-3C include block diagrams illustrating an example operation of a system for transferring data between a sender agent and a receiver agent.
Figure 3B:
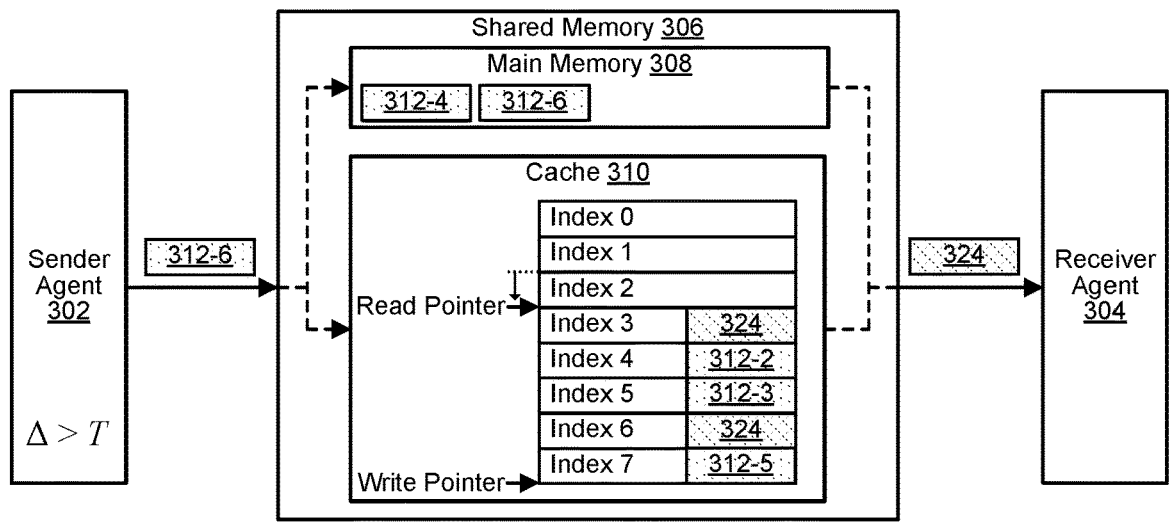
Figure 3C:
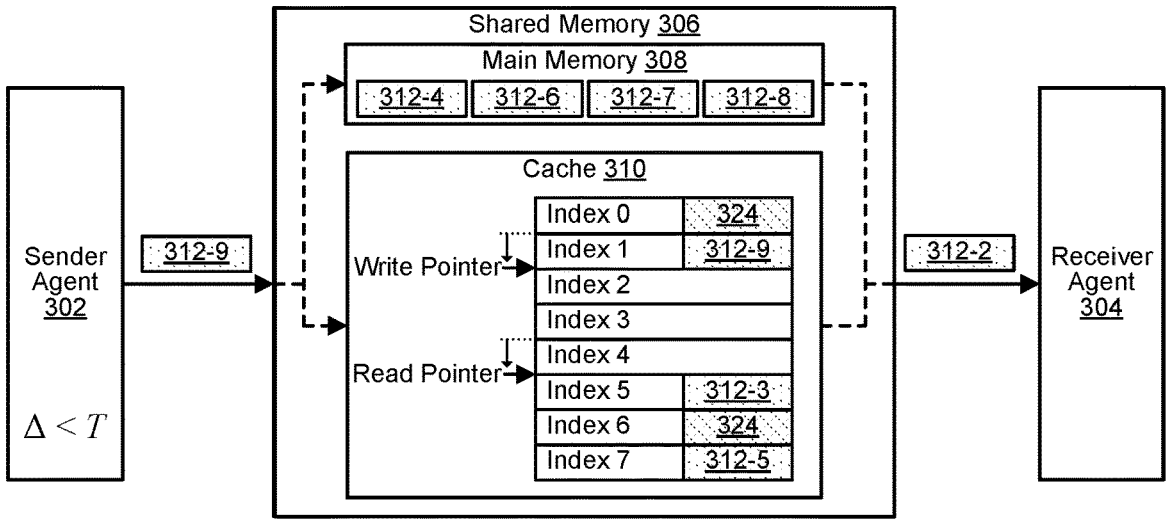

FIGS. 3A-3C include block diagrams illustrating an example operation of a system for transferring data between a sender agent 302 and a receiver agent 304, in accordance with some embodiments of the present disclosure. In the illustrated example, the sender agent 302 implements a caching policy in which a number of unread messages in a cache 310 of a shared memory 306 is compared to a threshold, which was set to 5.5. The caching policy dictates that any message is written to the cache 310 if the number of unread messages is less than 5.5 and to a main memory 308 of the shared memory 306 if the number of unread messages is greater than 5.5.

In reference to FIG. 3A, the sender agent 302 determines that the number of unread messages in the cache 310 is less than the threshold (e.g., 4<5.5), and accordingly designates the message 312-3 as being cacheable and writes the message 312-3 to Index 5 of the cache 310, causing the write pointer to be moved to the position between Index 5 and Index 6. The message 312-1, which was previously written to Index 1, is read by the receiver agent 304, causing the read pointer to be moved to the position between Index 1 and Index 2. Background process messages 324 occupy Index 2 and Index 3, which were written to the cache 310 by one or more background processes.

In reference to FIG. 3B, after the sender agent 302 writes the message 312-4 to the main memory 308, the one or more background processes write a background message 324 to Index 6, and the sender agent 302 writes the message 312-5 to Index 7, the sender agent 302 determines that the number of unread messages in the cache 310 is greater than the threshold (e.g., 6>5.5), and accordingly designates the message 312-6 as being non-cacheable and writes the message 312-6 to the main memory 308 and not to the cache 310, causing the write pointer to stay at the position between Index 7 and Index 0. The background message 324 that was previously written to Index 2 is read by the receiver agent 304, causing the read pointer to be moved to the position between Index 2 and Index 3.

In reference to FIG. 3C, after the one or more background processes write a background message 324 to Index 0 and the sender agent 302 writes the messages 312-7 and 312-8 to the main memory 308, the sender agent 302 determines that the number of unread messages in the cache 310 is less than the threshold (e.g., 5<5.5), and accordingly designates the message 312-9 as being cacheable and writes the message 312-9 to Index 1 of the cache 310, causing the write pointer to be moved to the position between Index 1 and Index 2. Further shown in FIG. 3C is the receiver agent 304 reading the message 312-2 from Index 4, causing the read pointer to be moved to the position between Index 4 and Index 5. In contrast to the example shown in FIG. 2C, the sender agent 302 does not waste time caching messages that will be later overwritten (e.g., the messages 212-3 and 212-4) and the receiver agent 304 does not waste time attempting to read overwritten messages.

Figure 4:
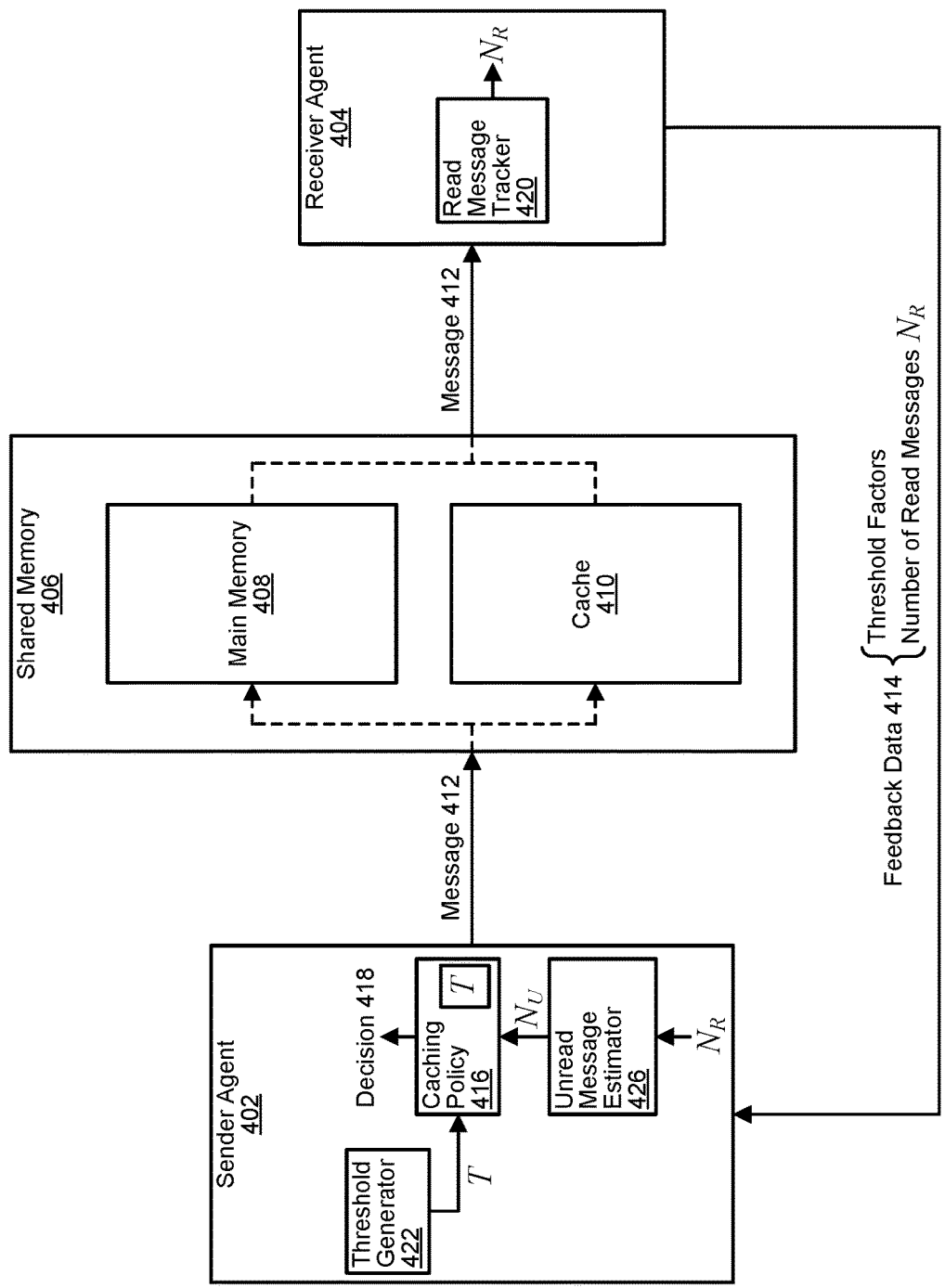
FIG. 4 includes a block diagram illustrating an example of a system for transferring data between a sender agent and a receiver agent.

FIG. 4 includes a block diagram illustrating an example of a system for transferring data between a sender agent 402 and a receiver agent 404, in accordance with some embodiments of the present disclosure. Each of the sender agent 402 and the receiver agent 404 are communicatively coupled to a shared memory 406 that includes a main memory 408 and a cache 410. The cache 410 may be a lower capacity and higher speed computer memory compared to the main memory 408. The sender agent 402 may be configured to write a message 412 to the shared memory 406 and the receiver agent 404 may be configured to read the message 412 from the shared memory 406, similar to that described in reference to FIG. 1.

Prior to the sender agent 402 writing the message 412 to the shared memory 406, the receiver agent 404 may determine a number of read messages $N_R$ in the shared memory 406. For example, the receiver agent 404 may include a read message tracker 420 that determines the number of read messages in the shared memory 406. The receiver agent 404 may send feedback data 414 to the sender agent 402 that includes the number of read messages in the shared memory 406. The sender agent 402 receives the feedback data 414 and estimates a number of unread messages $N_U$ in the shared memory 406 based on the number of read messages $N_R$ in the shared memory 406. For example, the sender agent 402 may include an unread message estimator 426 that estimates the number of unread messages in the shared memory 406 based on the number of read messages in the shared memory 406.

The feedback data 414 further includes the various threshold factors from which the threshold may be calculated by the sender agent 402 using a threshold generator 422. The sender agent 402 implements the caching policy 416 by comparing the number of unread messages in the shared memory 406 to the threshold to render a decision 418. The decision 418 may be to designate the message 412 as cacheable if the number of unread messages in the shared memory 406 is less than the threshold and non-cacheable if the number of unread messages in the shared memory 406 is greater than the threshold, similar to that described in reference to FIG. 1.

If the message 412 is designated as cacheable, the sender agent 402 attempts to write the message 412 to the cache 410. In some embodiments, a memory controller or system fabric associated with the shared memory 406 may receive the message 412 from the sender agent 402 and determine whether it will write the message 412 to the cache 410 or whether it will write the message 412 only to the main memory 408. In some instances, a cacheable message may be written to both the cache 410 and the main memory 408. If the message 412 is designated as non-cacheable, the sender agent 402 attempts to write the message 412 only to the main memory 408. The memory controller may receive the message 412 from the sender agent 402 and write the message 412 to the main memory 408. The receiver agent 404 may then read the message 412 at its location in the shared memory 406.

In one particular example, which may be implemented by the threshold generators 122 or 422 of either FIG. 1 or FIG. 4, respectively, the threshold generator considers a rate B (fetches/second) at which a background process fetches to the cache, a rate R (messages/second) at which the receiver agent reads messages from the cache, a size S of the cache, and an average number of messages N belonging to the sending process that occupy the cache at a given time. In this example, it is assumed that there is 1 sender and 1 receiver that share 1 cache, and that messages are the same size as 1 cache line. If it is further assumed that the cache always invalidates the oldest data, for a sent message to be used by the receiver agent, it needs to be read at the latest (S-N)/B seconds after it is input to the cache. If it is further assumed that B>>N, then the time for the cache to "refill" with the background process messages is S/B. In this scenario, for there to be no cache thrashing, N is determined to be N=(S/B)/R=Sx(R/B). In other words, this is the maximum number of messages present in the cache such that they will be read before the entire cache is refilled by the background process. In should be noted that S is a parameter of the system, while R and B are parameters that the receiver agent has control over. In this example, the value Sx(R/B) can be used as an initial threshold for the caching policy. If it is later determined that any of the values S, R, or B have changed, then the threshold for the caching policy can be updated accordingly.

Figure 5:
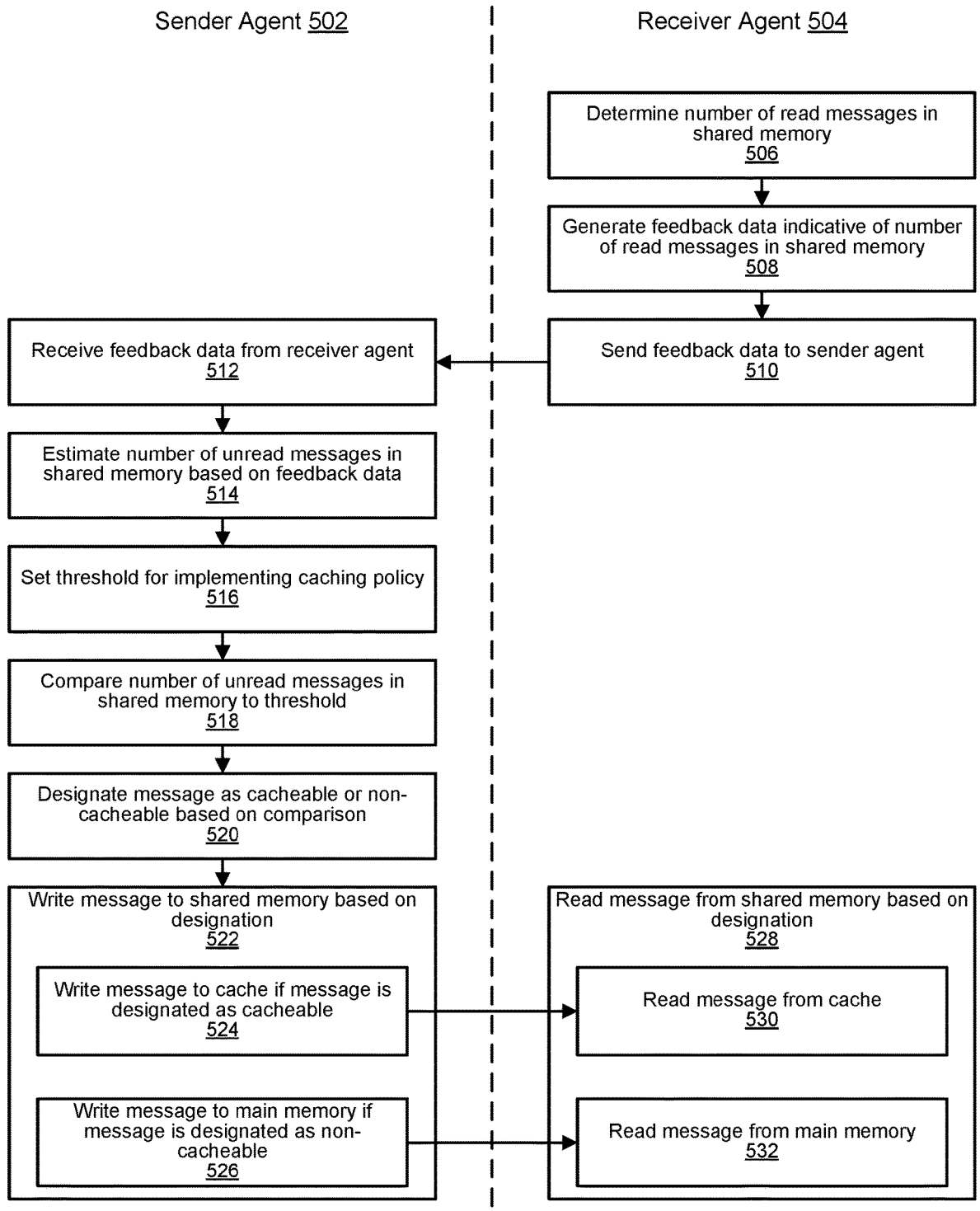
FIG. 5 illustrates an example of a method of transferring a message between a sender agent and a receiver agent.

FIG. 5 illustrates an example of a method 500 of transferring a message between a sender agent and a receiver agent, in accordance with some embodiments of the present disclosure. One or more steps of the method 500 may be omitted during performance of the method 500, and steps of the method 500 need not be performed in the order shown. One or more steps of the method 500 may be performed by a sender agent 502 or a receiver agent 504. The method 500 may be implemented as a computer-readable medium or computer program product comprising instructions which, when the program is executed by one or more computers, cause the one or more computers to carry out the steps of the method 500. Such computer program products can be transmitted, over a wired or wireless network, in a data carrier signal carrying the computer program product.

At step 506, a number of read messages in a shared memory (e.g., shared memories 106, 206, 306, 406) is determined. The number of read messages in the shared memory may be determined by a receiver agent (e.g., receiver agents 104, 204, 304, 404). The shared memory may include a cache (e.g., caches 110, 210, 310, 410) and a main memory (e.g., main memories 108, 208, 308, 408). The cache may be characterized by an access latency that is less than an access latency of the main memory. The cache may also be characterized by a capacity that is less than a capacity of the main memory. The number of read messages in the shared memory may correspond to the number of read messages in the cache (e.g., the number of messages that were read from the cache during a time period) and/or the number of read messages in the main memory (e.g., the number of messages that were read from the main memory during the time period). The number of read messages from the shared memory (e.g., cache) may be determined by determining the difference between the position of a read pointer that references an index in the shared memory (e.g., cache) at a first time and at a second time.

At step 508, feedback data (e.g., feedback data 114, 414) that is indicative of the number of read messages in the shared memory is generated. The feedback data may be generated by the receiver agent. In some embodiments, the feedback data may further include a threshold to be used in a caching policy (e.g., caching policies 116, 416). For example, the receiver agent may calculate the threshold and may incorporate the threshold into the feedback data. The threshold may be calculated based on various factors (i.e., threshold factors), such as (1) the rate at which messages are read from the shared memory (e.g., cache) by the receiver agent (i.e., the receiver read rate), (2) the rate at which messages are written to the shared memory (e.g., cache) by background processes (i.e., the background write rate), (3) the rate at which messages are read from the shared memory (e.g., cache) by background processes (i.e., the background read rate), (4) the rate at which messages are written to the shared memory (e.g., cache) by the sender agent (i.e., the sender write rate), and (5) the current size of the shared memory (e.g., cache), such as the available or allocated portion of the cache, among other possibilities.

In some embodiments, the feedback data may include data to be used by the sender agent in determining the threshold. For example, the feedback data may include the rate at which messages are read from the shared memory (e.g., cache) by the receiver agent, the rate at which messages are written to the shared memory (e.g., cache) by background processes, the rate at which messages are read from the shared memory (e.g., cache) by background processes, the rate at which messages are written to the shared memory (e.g., cache) by the sender agent, and the current size of the shared memory (e.g., cache).

At step 510, the feedback data is sent to a sender agent (e.g., sender agents 102, 202, 302, 402). The feedback data may be sent by the receiver agent to the sender agent. The feedback data may be sent via a feedback path between the receiver agent and the sender agent.

At step 512, the feedback data is received by the sender agent. The feedback data may be received by the sender agent from the receiver agent. The feedback data may be received via the feedback path between the receiver agent and the sender agent.

At step 514, a number of unread messages in the shared memory (e.g., cache) is estimated based on the feedback data. The number of unread messages in the shared memory may be estimated by the sender agent. The number of unread messages in the shared memory may be estimated based on the number of read messages in the shared memory. The feedback data may include the number of read messages in the shared memory directly or may include data from which the sender agent may determine the number of read messages in the shared memory. The estimated number of unread messages in the shared memory may be updated each time new feedback data is received by the sender agent or at some other rate.

At step 516, the threshold for implementing the caching policy is set. The threshold may be set by the sender agent. The threshold may be set to the value calculated by the receiver agent as included in the feedback data or may be set to the value calculated by the sender agent based on the threshold factors as included in the feedback data. The threshold may be reset or updated each time new feedback data is received by the sender agent or at some other rate.

At step 518, the number of unread messages in the shared memory is compared to the threshold. The number of unread messages in the shared memory may be compared to the threshold by the sender agent. In some embodiments, it may be determined whether the number of unread messages in the shared memory is greater than or is less than the threshold.

At step 520, a message (e.g., messages 112, 212, 312, 412) to be sent from the sender agent to the receiver agent is designated as cacheable or non-cacheable. The message may be designated as cacheable or non-cacheable by the sender agent. The message may be designated as cacheable or non-cacheable based on the comparison. In some embodiments, the message may be designated as cacheable if the number of unread messages in the shared memory is less than the threshold and as non-cacheable if the number of unread messages in the shared memory is greater than the threshold. Designating the message as cacheable or non-cacheable may include generating an attribute for the message that indicates that the message is cacheable or non-cacheable. In some embodiments, designating the message as cacheable or non-cacheable may include generating instructions for the message to be written to the cache or to the main memory.

At step 522, the message is written to the shared memory based on the designation. The message may be written to the shared memory by the sender agent. In some embodiments, step 522 includes one or both of steps 524 and 526. At step 524, the message is written to the cache if the message is designated as cacheable. The message may be written to the cache by the sender agent. In some embodiments, the message may also be written to the main memory if the message is designated as cacheable. At step 526, the message is written to the main memory if the message is designated as non-cacheable. The message may be written to the main memory by the sender agent.

At step 528, the message is read from the shared memory. The message may be read from the shared memory by the receiver agent. The message may be read from the shared memory based on the designation. In some embodiments, step 528 includes one or both of steps 530 and 532. At step 530, the message is read from the cache. The message may be read from the cache by the receiver agent. The message may be read from the cache if the message is designated as cacheable. At step 532, the message is read from the main memory. The message may be read from the main memory by the receiver agent. The message may be read from the main memory if the message is designated as non-cacheable.

Figure 6:
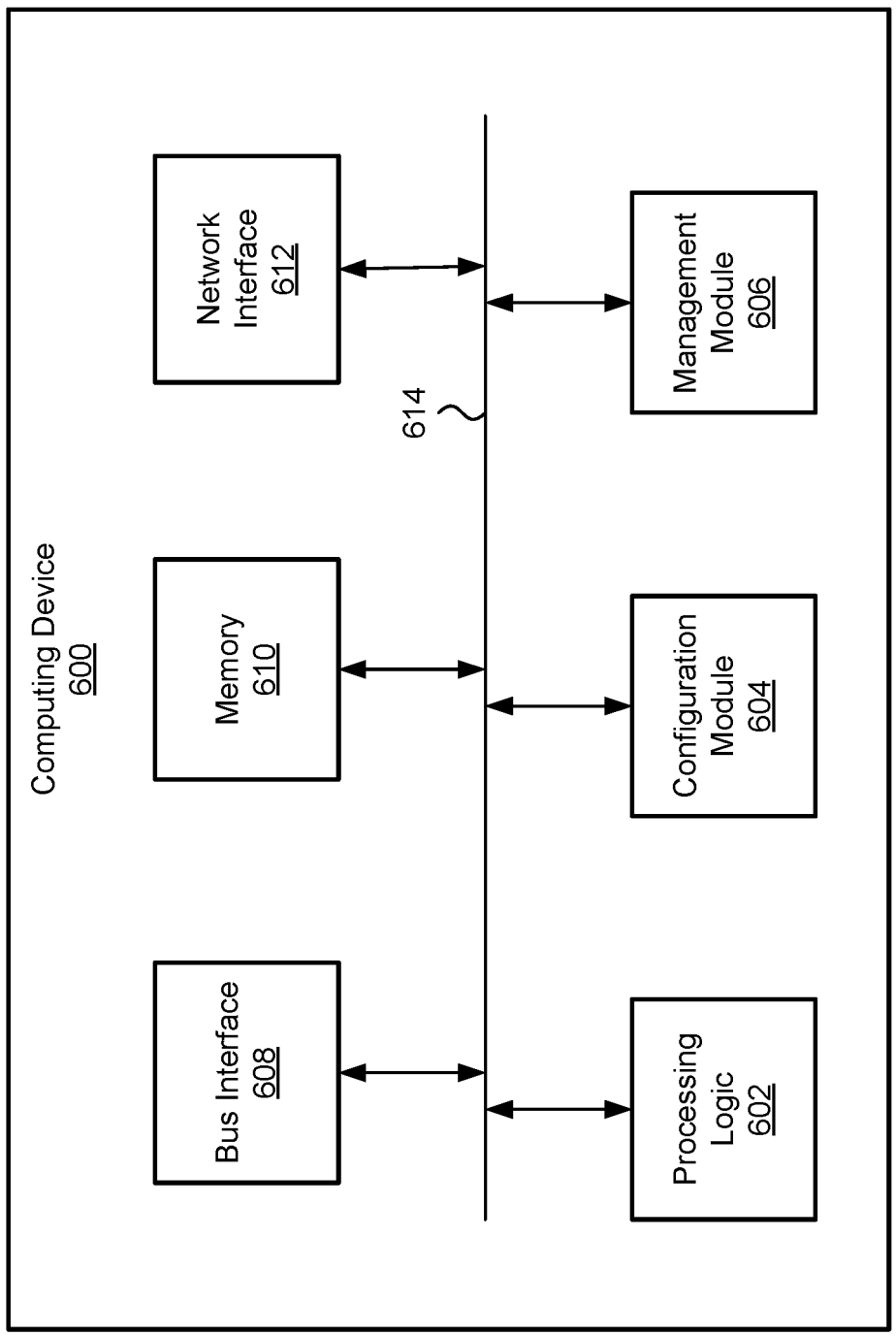
FIG. 6 illustrates an example of a computing device.

FIG. 6 illustrates an example of a computing device 600, in accordance with some embodiments of the present disclosure. Functionality and/or several components of the computing device 600 may be used without limitation with other embodiments disclosed elsewhere in this disclosure, without limitations. For example, the computing device 600 may include one or more components corresponding to a sender agent, a receiver agent, or a shared memory.

In some embodiments, the computing device 600 may be network device that facilitates processing of packets and/or forwarding of packets from the computing device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 600 may be the recipient and/or generator of packets. In some implementations, the computing device 600 may modify the contents of the packet before forwarding the packet to another device. The computing device 600 may be a peripheral device coupled to another computer device, a switch, a router or any other suitable device enabled for receiving and forwarding packets.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules or fewer modules than illustrated in FIG. 6. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory may also store and maintain several data structures and routing tables for facilitating the functionality of the computing device 600.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc.

The modules described herein may be software modules, hardware modules or a suitable combination thereof If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
    a shared memory having a shared address space, the shared memory comprising:
        a main memory characterized by a first capacity and a first access latency; and
        a cache characterized by a second capacity that is less than the first capacity and a second access latency that is less than the first access latency; and
    a sender agent coupled to the shared memory, wherein the sender agent is operable to:
        obtain feedback data indicating a number of read messages in the shared memory;
        set a threshold for implementing a caching policy based on the feedback data;
        estimate a number of unread messages in the shared memory based on the number of read messages in the shared memory;
        compare the number of unread messages in the shared memory to the threshold; and
        write a message to the shared memory with a designation indicating whether the message is cacheable based on the comparison.

2. The integrated circuit device of claim 1, wherein the number of unread messages in the shared memory is less than the threshold, and the designation indicates that the message is cacheable.

3. The integrated circuit device of claim 1, wherein the number of unread messages in the shared memory is greater than the threshold, and the designation indicates that the message is non-cacheable.

4. The integrated circuit device of claim 1, wherein the feedback data includes the threshold.

5. The integrated circuit device of claim 1, wherein the feedback data is from a receiver agent that is operable to determine the number of read messages in the shared memory.

6. A computer-implemented method comprising:
- obtaining feedback data indicative of a number of read messages in a shared memory, the shared memory comprising a main memory and a cache;
- estimating a number of unread messages in the shared memory based on the number of read messages in the shared memory;
- comparing the number of unread messages in the shared memory to a threshold;
- determining whether a message is cacheable based on the comparison; and
- writing the message to the cache or the main memory of the shared memory based on whether the message is cacheable.

7. The computer-implemented method of claim 6, further comprising:
- setting the threshold for implementing a caching policy based on the feedback data.

8. The computer-implemented method of claim 7, wherein the threshold is set based on a read rate corresponding to a rate at which messages are read from the shared memory.

9. The computer-implemented method of claim 6, wherein the number of unread messages in the shared memory corresponds to a number of unread messages in the cache.

10. The computer-implemented method of claim 6, wherein the message is determined to be cacheable, and the message is written to both the cache and the main memory.

11. The computer-implemented method of claim 6, wherein the feedback data includes the threshold.

12. A computer-implemented method comprising:
- generating feedback data indicative of a number of read messages in a shared memory, the shared memory comprising a main memory and a cache, wherein an access latency of the cache is less than an access latency of the main memory;
- sending the feedback data to a sender agent that designates whether a message is cacheable based on an estimation of a number of unread messages in the shared memory derived from the feedback data; and
- reading the message from the cache or the main memory of the shared memory based on whether the message is designated as cacheable.

13. The computer-implemented method of claim 12, wherein the feedback data includes a threshold that is set based on a read rate corresponding to a rate at which messages are read from the shared memory.

14. The computer-implemented method of claim 13, wherein the number of unread messages in the shared memory is greater than the threshold, and the message is designated as non-cacheable.

15. The computer-implemented method of claim 13, wherein the number of unread messages in the shared memory is less than the threshold, and the message is designated as cacheable.

16. A non-transitory computer-readable medium comprising instructions that, when executed by one or more processors, cause the one or more processors to perform operations comprising:
- obtaining feedback data indicative of a number of read messages in a shared memory, the shared memory comprising a main memory and a cache;
- estimating a number of unread messages in the shared memory based on the number of read messages in the shared memory;
- comparing the number of unread messages in the shared memory to a threshold;
- determining whether a message is cacheable based on the comparison; and
- writing the message to the cache or the main memory of the shared memory based on whether the message is cacheable.

17. The non-transitory computer-readable medium of claim 16, wherein the operations further comprise:
- setting the threshold for implementing a caching policy based on the feedback data.

18. The non-transitory computer-readable medium of claim 17, wherein the threshold is set based on a read rate corresponding to a rate at which messages are read from the shared memory.

19. The non-transitory computer-readable medium of claim 16, wherein the message is determined to be cacheable, and the message is written to both the cache and the main memory.

20. The non-transitory computer-readable medium of claim 16, wherein the feedback data is generated by a receiver agent that reads the message from the shared memory after the message has been written to the shared memory.

* * * * *